United States Patent
Schwartz et al.

(10) Patent No.: US 9,846,174 B2
(45) Date of Patent: Dec. 19, 2017

(54) COMPUTER-IMPLEMENTED METHODS AND COMPUTER SYSTEMS/MACHINES FOR IDENTIFYING DEPENDENT AND VEHICLE INDEPENDENT STATES

(71) Applicants: Roy Schwartz, Mountain Lakes, NJ (US); Zarick Schwartz, Mountain Lakes, NJ (US)

(72) Inventors: Roy Schwartz, Mountain Lakes, NJ (US); Zarick Schwartz, Mountain Lakes, NJ (US)

(*) Notice: Subject to any disclaimer, the term of this patent is extended or adjusted under 35 U.S.C. 154(b) by 369 days.

(21) Appl. No.: 14/329,862

(22) Filed: Jul. 11, 2014

(65) Prior Publication Data

US 2016/0010984 A1 Jan. 14, 2016

Related U.S. Application Data

(60) Provisional application No. 61/957,803, filed on Jul. 12, 2013.

(51) Int. Cl.
| | |
|---|---|
| *B60W 40/10* | (2012.01) |
| *G01P 13/02* | (2006.01) |
| *G06F 3/01* | (2006.01) |
| *B60W 40/11* | (2012.01) |

(52) U.S. Cl.
CPC ............ *G01P 13/02* (2013.01); *B60W 40/10* (2013.01); *B60W 40/11* (2013.01); *G06F 3/017* (2013.01); *B60W 2420/905* (2013.01)

(58) Field of Classification Search
CPC combination set(s) only.
See application file for complete search history.

(56) References Cited

U.S. PATENT DOCUMENTS

| | | | |
|---|---|---|---|
| 8,666,589 B2* | 3/2014 | Munnix | B60W 40/10 701/30.2 |
| 9,127,946 B1* | 9/2015 | Menon | G01C 21/16 |
| 9,152,609 B2* | 10/2015 | Schwartz | B60R 25/00 |
| 2008/0015765 A1* | 1/2008 | Sekine | B60T 7/22 701/78 |
| 2010/0204877 A1 | 8/2010 | Schwartz | |
| 2011/0081634 A1* | 4/2011 | Kurata | G01C 21/20 434/236 |
| 2013/0046505 A1* | 2/2013 | Brunner | G01C 21/165 702/141 |

\* cited by examiner

*Primary Examiner* — Huan Tran

(57) ABSTRACT

This application relies on terminology found in the Vehicle State Detection (STATE) patent and describes methods of detecting acceleration, deceleration, accidents and cornering operational states, which we will also call vehicle dependent states, and vehicle independent states, triggered when the portable device is moved independently of movement of the vehicle. These methods enhance classification of driving behavior.

5 Claims, 2 Drawing Sheets

Detecting vehicle cornering condition or vehicle independent movement

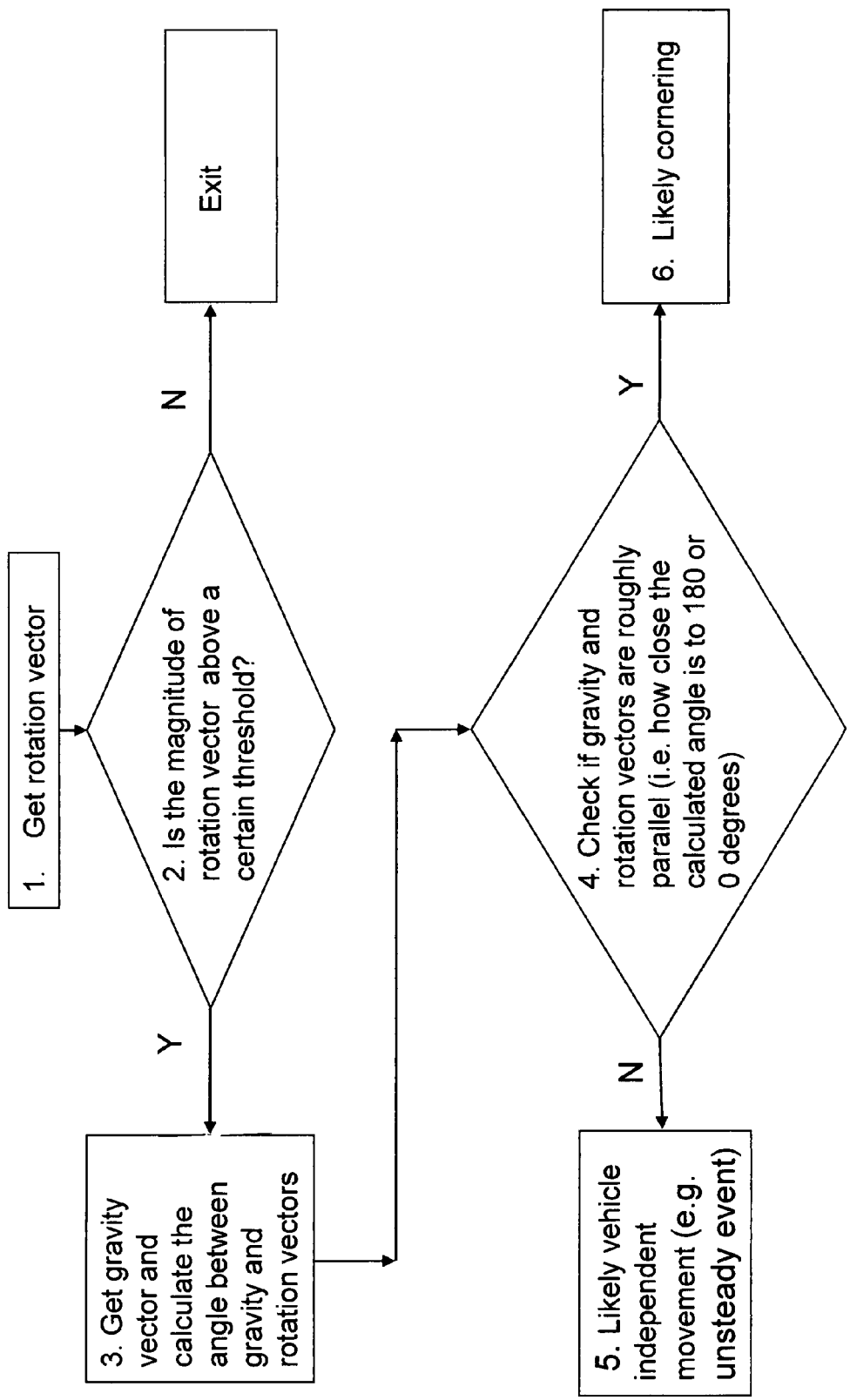
Figure 1: Detecting vehicle cornering condition or vehicle independent movement

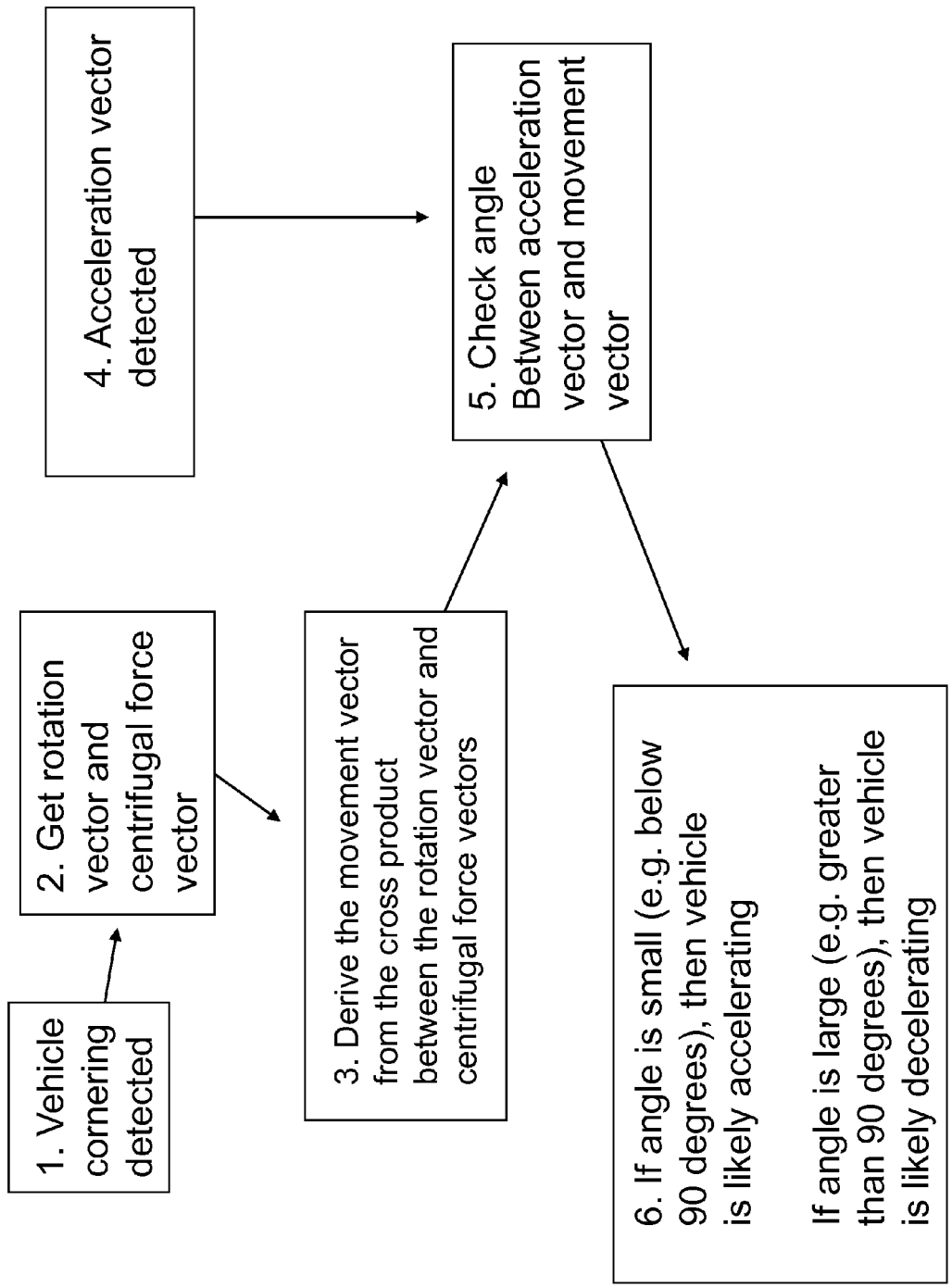
Figure 2: Detecting direction (accelerating or braking) of acceleration vector

COMPUTER-IMPLEMENTED METHODS AND COMPUTER SYSTEMS/MACHINES FOR IDENTIFYING DEPENDENT AND VEHICLE INDEPENDENT STATES

BACKGROUND

Many portable devices, such as smartphones and tablets, contain sensors which, when used in conjunction with specific algorithms, can accurately detect and analyze many different kinds of states which pertain to the environment directly outside the device. The methods described in this invention pertain specifically to detecting various kinds of vehicle dependent movement(acceleration, deceleration, accidents and cornering operational states, etc) as well as vehicle independent movement of the phone (movement caused by the user handling the phone, phone falling to the ground, etc). The various embodiments of the instant invention described herein can be utilized in conjunction with methods and/or devices described in U.S. Patent Vehicle state detection (Publication number U.S. Pat. No. 8,527,140 B2), whose specific disclosures about vehicle dependent states (e.g., acceleration, deceleration, accidents and cornering operational states, and others) and vehicle independent states, triggered when the portable device is moved independently of movement of the vehicle are hereby incorporated by reference herein in its entirety and are further referred to herein as the "STATE disclosure." These operational states referred herein as dependent and intependent states respectively or simply states, wherein the events that cause the transition to these dependent and independent states referred respectively as dependent and independent events or simply events.

DETAILED DESCRIPTION WITH ILLUSTRATIVE EXAMPLES

In order to provide a Driver Evaluation service or enhanced Automatic Detection of Driving capabilities it is important to be able to detect vehicle dependent states such as cornering, accelerating and braking, while also recognizing vehicle independent event (movement caused by the user handling the phone, phone falling to the ground, etc) in order to eliminate or significantly reduce the chances of erroneous driving events being registered. The detection can be accomplished using a system of methods or computer machines (apparatus) as described below.

Detecting Cornering and Vehicle Independent Movement of the Phone

In order to detect when a vehicle turns (i.e. cornering) we have identified a unique condition that is associated with turning in a vehicle. The condition is that at the time of the turn, the vector of rotation will be roughly parallel to the vector of gravity, and will not be affected as much if the turn is horizontal or not. We use this condition to identify the probability of turning, as a function of the angle between these two vectors. The vector of rotation can be calculated using gyroscope samples, while the vector of gravity can be obtained by using a low pass filter on the samples produced by the accelerometer.

If the vectors of rotation and gravity are not roughly parallel, this is an indicator that the phone has been picked up, or fallen (vehicle independent event occurred).

FIG. 1 depicts the steps to accomplish this. In Step 1 the rotation vector is calculated. In Step 2 the system checks the magnitude of the rotation vector and considers the rotation vectors of sufficiently large magnitude. If the magnitude large enough then in Step 3 the gravity vector is obtained and the angle between gravity and rotation vectors is calculated to check if they parallel. If they roughly parallel then in Step 4 the system determines that the cornering event occurred otherwise unsteady event occurred. The estimation of the cornering can depend on the probability that the cornering occurred as a function of the angle between gravity vector and rotation vector. If the angle is close to 180 or 0 then the probability will be close to 1.

Detecting Direction (Accelerating or Braking) of a Speed Change Vector

Methods of detecting speed changes are described in the STATE disclosure. We know the vectors that are associated with the speed change, but we do not know which of them is associated with acceleration and deceleration. Below is a method of detecting whether a speed change vector is associated with acceleration or deceleration.

There are unique conditions that can be used to identify the direction of acceleration and decelerations:

1. The vector of movement of the vehicle in the phone coordinates is not changed if the vehicle is turning.
2. There will be high probability that the movement vector of the vehicle during a turn corresponds to acceleration.

In some embodiments using these conditions we can estimate the direction of acceleration, which should closely align with the movement vector. The deceleration will be in the opposite direction. The movement vector can be derived from the cross product between the centrifugal force and rotation vector, while the vehicle is turning. The direction of the centrifugal force can be derived from the accelerometer samples collected during the turn, applying filters to remove gravity.

This detection process is illustrated in FIG. 2. In Step 1 turn of the vehicle (cornering is detected, which a precondition for identifying the movement vector). In Step 2 and 3 the movement vector is calculated ad described above. Then in Step 4 and 5 any time when speed change vector is detected the vector of the speed change is compared to the previously detected movement vector. In step 6 then the system determines if the speed change vector is acceleration vector or deceleration vector depending how closely it is aligned with the movement vector, by checking the angle between the speed change vector and movement vector. The estimation of the acceleration and deceleration can depend on the probability as a function of the angle between speed change vector and movement vector. For example when the angle is 0 between the movement vector and speed change vector, the probability of speed change vector being acceleration vector will be 1.

Retroactively Determining Operational States

In some embodiments certain mechanisms (such as the detection of acceleration direction) may take a certain amount of time to work (i.e. training the model), during which there will be other "change in speed" events that the system will not be able to assign a direction to. Therefore, once direction is detected the system is able to retroactively assign a direction (accelerating or decelerating) to these events based on certain properties detected at the time of the event.

It is understood that at least one aspect/functionality of various embodiments described herein can be performed in real-time and dynamically. As used herein, the term "real-time" means that an event/action can occur instantaneously or almost instantaneously in time when another event/action has occurred. For example, in some embodiments, an event occurs in real-time if a time difference between a first time when a particular signal is detected and a second time when the instant invention calculates a subsequent action is not more than 1 millisecond. In another example, in some embodiments, an event occurs in real-time if a time difference between a first time when a particular signal is detected and a second time when the instant invention calculates a subsequent action is between less than 1 second and 1 minute. In another example, in some embodiments, an event occurs in real-time if a time difference between a first time when a particular signal is detected and a second time when the instant invention calculates a subsequent action is between less than 1 nanosecond and 1 minute. In another example, in some embodiments, an event occurs in real-time if a time difference between a first time when a particular signal is detected and a second time when the instant invention calculates a subsequent action is between less than 1 millisecond and 1 minute.

As used herein, the terms "dynamic(ly)" and "automatically" mean that an event/action that can occur without any human intervention. The event/action may be in real-time and/or hourly, daily, weekly and/or monthly, etc.

Throughout the specification, the following terms take the meanings explicitly associated herein, unless the context clearly dictates otherwise. The phrases "In some embodiments" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

While a number of embodiments of the present invention have been described, it is understood that these embodiments are illustrative only, and not restrictive, and that many modifications may become apparent to those of ordinary skill in the art. Further still, the various steps may be carried out in any desired order (and any desired steps may be added and/or any desired steps may be eliminated).

BRIEF DESCRIPTION OF THE DRAWINGS

The teachings herein can be readily understood by considering the following detailed description in conjunction with the accompanying drawings:

FIG. 1: Shows how vehicle cornering or vehicle independent movement is detected

FIG. 2: Shows how to detect the direction (either accelerating or braking) of an acceleration vector

SUMMARY

We propose a novel method of identifying when the vehicle turns by considering that the gravity and rotation vectors are usually parallel when the turn occurs. In addition we propose to use identification of the turns for determining movement vector and based on the movement vector identifying acceleration and deceleration vectors. In some embodiments, this instant invention enhances determination and classification of driving behavior, in particular distinguishing between the dependent and independent operational states described in the STATE disclosure.

Illustrative Examples of Some Uses of the Instant Invention

Driver Evaluation—The methods of this invention allow for the smartphone to be used to detect driving events such as acceleration/deceleration, and cornering with multiple levels of severity for each. Reported events can be combined and evaluated at the end of the trip to provide scores representative of driving riskiness, or fuel efficiency.

Such scores may be useful for users interested in improving their driving safety or fuel efficiency, as well as fleets (taxi, trucking, etc) and insurance companies who will be able to utilize scores to assess the riskiness of their customers, and set prices accordingly, a field of insurance known as UBI (Usage-based Insurance). The ability to differentiate between vehicle dependent and vehicle independent events are crucial for any kind of driver evaluation, because it is common for most users to pick up their phones during driving, or for the phone to get knocked to the ground, which could potentially cause erroneous driving events to be reported.

Automatic Detection of Driving: The instant invention also allows for improved methods of detecting that a vehicle has started and stopped driving, automatically and transparently to the user, as described in the STATE disclosure. The method of detecting vehicle dependent events, such as cornering and acceleration/deceleration, will increase the speed and accuracy of detection of driving, because these are excellent indicators of driving, which rarely happen during normal use of the phone. This may be a useful feature in many smartphone apps, including but not limited to driver evaluation, parking, finding parked vehicles, etc, because users may not want to have to remember to turn the app on and off before and after trips.

The instant invention can also be used for stationary devices permanently installed in the vehicles because it gives precise indication for example when turns occur.

The invention claimed is:

1. The method of detecting the condition of a vehicle turning, comprising estimating an angle of how closely a rotation vector is aligned with a gravity vector.

2. The method of claim 1 further comprises estimating the probability of the vehicle turning as a function of the angle between the rotation vector and the gravity vector.

3. The method of detecting a direction of a speed change vector, comprising:
   a. detecting a condition of a vehicle turning;
   b. detecting a movement vector during the turn;

c. estimating the angle between movement vector and speed change vector;

d. determining that the speed change vector is acceleration vector if the estimated angle below certain threshold and determining that the speed change vector is deceleration vector if the estimated angle is above certain threshold.

4. The method of claim 3 further comprises estimating the probability of the speed change vector to be an acceleration or deceleration vector—as a function of the angle between the speed change vector and the movement vector.

5. The method of performing one or more actions on a portable device carried by an individual, comprising:

a. monitoring at least one operation indicator transparently to the individual, wherein the at least one operation indicator is created by an on-board component of the device when the portable device is located inside a vehicle;

b. detecting when the at least one operation indicator meets one or more predetermined criteria;

c. determining entirely or in part the following states based on the one or more predetermined criteria:
  i. one or more vehicle independent states;
  ii. one or more vehicle dependent states.

* * * * *